United States Patent
Cedola

(10) Patent No.: US 6,625,669 B1
(45) Date of Patent: Sep. 23, 2003

(54) RENAMING OF VIRTUAL COMMUNICATION PORT FOR IR DEVICES

(75) Inventor: Kent D. Cedola, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/507,479

(22) Filed: Feb. 17, 2000

(51) Int. Cl.⁷ .............................................. G06F 13/00
(52) U.S. Cl. ..................... 710/9; 710/7; 710/8; 710/10; 710/62; 710/106
(58) Field of Search ............................ 710/7, 8, 10, 62, 710/106

(56) References Cited

U.S. PATENT DOCUMENTS 5,787,305 A * 7/1998 Chen ........................... 707/540
6,061,349 A * 5/2000 Coile et al. .................. 370/389
6,360,281 B1 * 3/2002 Feagans ........................ 710/1

* cited by examiner

Primary Examiner—Jeffrey Gaffin
Assistant Examiner—Mohammad O. Farooq
(74) Attorney, Agent, or Firm—Lee & Hayes, PLLC

(57) ABSTRACT

A computer operating system identifies and renames communication (COMM) ports associated with infrared (IR) transceivers that communicate with IR devices. The operating system detects all available COMM ports, identifies a COMM port dedicated to an IR transceiver, and renames that COMM port from a non-descriptive virtual port name (e.g., COM4) to another, more descriptive virtual port name (e.g., "Infrared Port"). In this manner, rather than seeing a list of indistinguishable virtual port names (e.g., "COM0", "COM1", . . . "COM9") in which one may be dedicated to the IR transceiver, a user is presented with a list of virtual port names that includes one conspicuously descriptive port name (e.g., "Infrared Port"). This removes the guesswork and frustration for the user during configuration. The operating system also enables reverse conversion from the descriptive name back to the non-descriptive virtual port name for internal use.

27 Claims, 5 Drawing Sheets

RENAMING OF VIRTUAL COMMUNICATION PORT FOR IR DEVICES

TECHNICAL FIELD

This invention relates to computer operating systems, and particularly, to computer methods for identifying and naming communication ports associated with infrared (IR) devices.

BACKGROUND

Conventional computers have multiple communication ports (or "COMM" ports) for connecting peripheral devices, such as printers or modems. One of the ports is typically dedicated to communicate with infrared (IR) devices via an IR transceiver. Common IR devices include handheld computers (e.g., palmtops, pocket computers, personal digital assistants, personal organizers, etc.), keyboards, a computer mouse, remote control handset, and the like. The computer is typically equipped with an IR receiver, which is mounted as part of the unit or externally (e.g., an IR dongle). The IR receiver is connected to the dedicated COMM port.

One problem that arises is when a user first tries to configure his/her computer for communication with the IR device. In a Windows-brand operating system from Microsoft Corporation, the communication ports are represented by virtual port names, such as "COM0", "COM1", . . . , "COM9", and so on. During configuration, the user is presented with a list of these virtual port names. Unfortunately, the user is required to know, or guess, which communication port is associated with IR devices. For instance, it may be that COM4 is the port for IR devices, but such information would not be readily apparent or obvious to the user. The user can obtain the name of the IR virtual COMM port from the Control Panel. Wireless dialog, but this is not obvious for most user.

Accordingly, there is a need to improve the user experience during configuration of a computer for IR communication.

SUMMARY

This invention concerns an operating system and method for identifying and naming communication (COMM) ports associated with infrared (IR) devices. According to a described implementation, the system detects all available COMM ports, identifies the COMM port dedicated to an IR transceiver that interfaces with IR devices, and renames that COMM port from a non-descriptive virtual port name (e.g., "COM4") to another, more descriptive virtual port name (e.g., "Infrared Port"). The descriptive virtual port name is then used when presenting a list of available COMM ports to a user. In this manner, rather than seeing a list of indistinguishable virtual port names (e.g., "COM0", "COM1", . . . "COM9") in which one may be dedicated to the IR transceiver, the user is presented with a list of virtual port names that includes one conspicuously descriptive port name (e.g., "Infrared Port"). This removes the guesswork and frustration for the user during configuration. The system also enables reverse conversion from the descriptive name back to the non-descriptive virtual port name for internal use.

BRIEF DESCRIPTION OF THE DRAWINGS

The same reference numbers are used throughout the drawings to reference like components and features.

DETAILED DESCRIPTION

Figure 1:
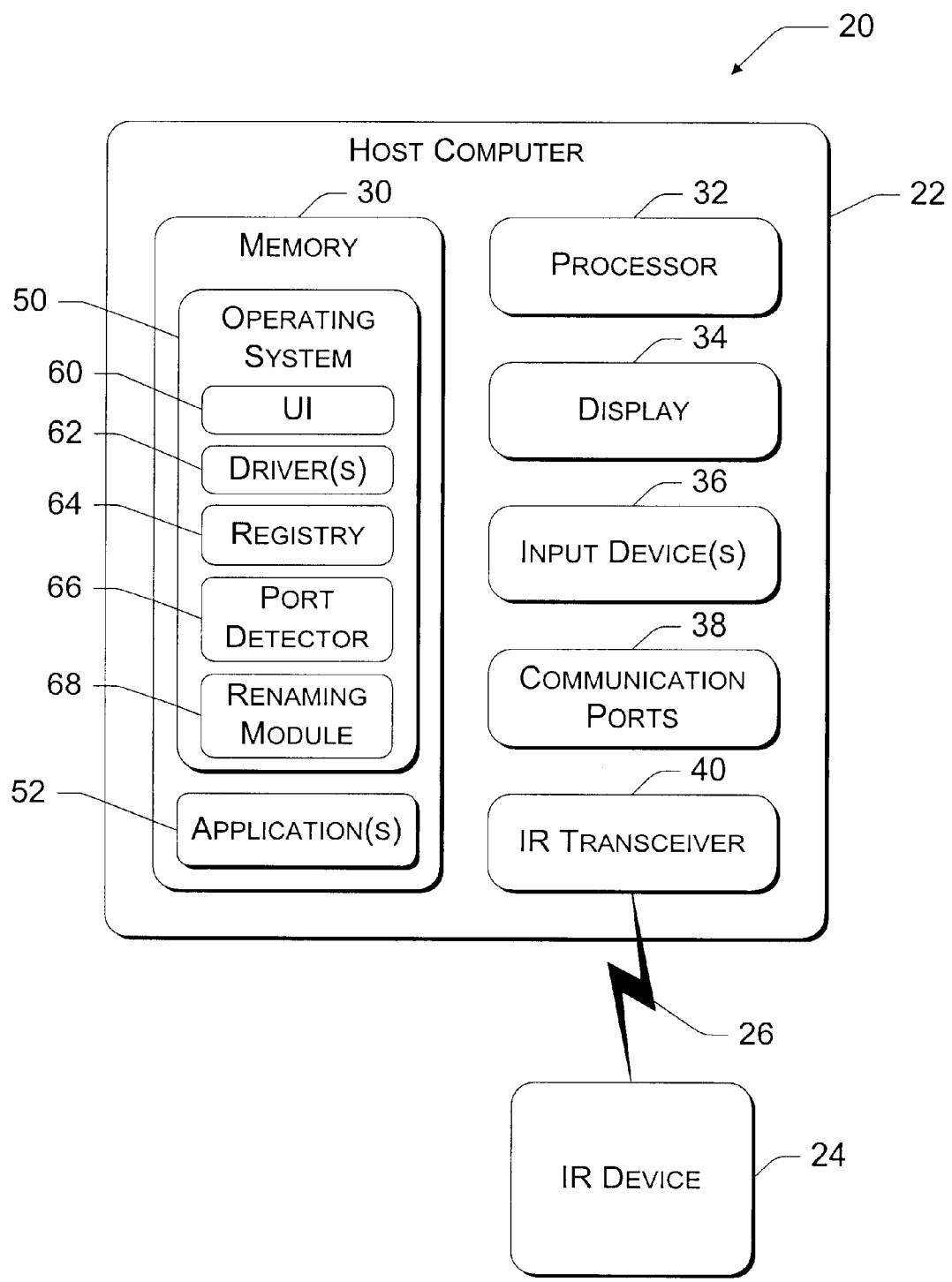
FIG. 1 is a block diagram of a computer coupled to an IR device.

FIG. 1 shows a computer system 20 having a host computer 22 connected to communicate with an infrared (IR) device 24 via a wireless IR connection 26. The host computer 22 may be embodied in many ways including, for example, a desktop computer, a laptop computer, a set-top box, or the like. The IR device 24 may also be implemented in a number of ways, such as a handheld computer, a telephone or other communication device, a personal digital assistant, and so forth. The IR device may also be configured to run an operating system (not shown), such as the Windows CE operating system from Microsoft Corporation.

The host computer 22 has a memory 30, processor 32, a display 34, and one or more input devices 36 (e.g., keyboard, mouse, etc.). The memory 30 generally includes both volatile memory (e.g., RAM) and non-volatile memory (e.g., Flash, ROM, hard disk, etc.). The compute 22 is also equipped with multiple communication (COMM) ports 38 and an infrared (IR) transceiver 40 to communicate with the IR device 24. The IR transceiver 40 is connected to one of the COMM ports 38 and may reside internally or externally.

An operating system 50 resides in memory 30 and executes on the processor 32. The computer 22 preferably runs a Windows-brand operating system from Microsoft Corporation, such as Win32-based products (e.g., Windows 95, Windows 98, etc.), although other operating systems may be used. One or more application programs 52 are loaded into memory 30 and run on the operating system 50. Examples of applications 52 include email programs, scheduling programs, remote device services programs, word processing programs, Internet browser programs, and so on.

The operating system 50 has a user interface (U1) 60, which preferably supports a graphical windowing environment. The operating system 50 also has a set of software drivers 62 for various hardware components, including any peripheral devices connected through the COMM ports. An IR driver is provided in the set of drivers 62 to manage the COMM port dedicated to the IR transceiver 40.

A system registry 64 is provided in the operating system 50 to track configuration parameters of the computer 22, including whether the IR transceiver 40 is configured for operation with the computer 22. Among other things, the registry 64 keeps track of the COMM ports 38 and the virtual port names associated with the COMM ports. In Win32 products, the virtual port names follow the format "COM#", where the "#" is a numeric value. For instance, it is common to have a number of ports with associated virtual port names of "COM0", "COM1", . . . "COM9".

The computer 22 has a port detector 66 and a port renaming module 68, which are shown implemented as part of the operating system 50, but may be implemented separately. The port detector 66 detects which COMM ports are available and returns a list of the available ports. From this list, the port renaming module 68 identifies which COMM port is specially dedicated to IR transceivers and renames the COMM port from a non-descriptive virtual port name (e.g., "COM4") to another, more descriptive virtual port name (e.g., "Infrared Port"). In this manner, the system 20 offers an improved user experience during configuration of the computer 22 for IR communication with the IR device 24. Rather than seeing a list of indistinguishable virtual port names (e.g., "COM0", "COM1", ... "COM9") in which one may be dedicated to communication with IR devices, the user is presented with a list of virtual port names that includes one conspicuously descriptive port name, such as "Infrared Port". This removes the guesswork, confusion, and any frustration on the part of the user during configuration.

Figure 2:
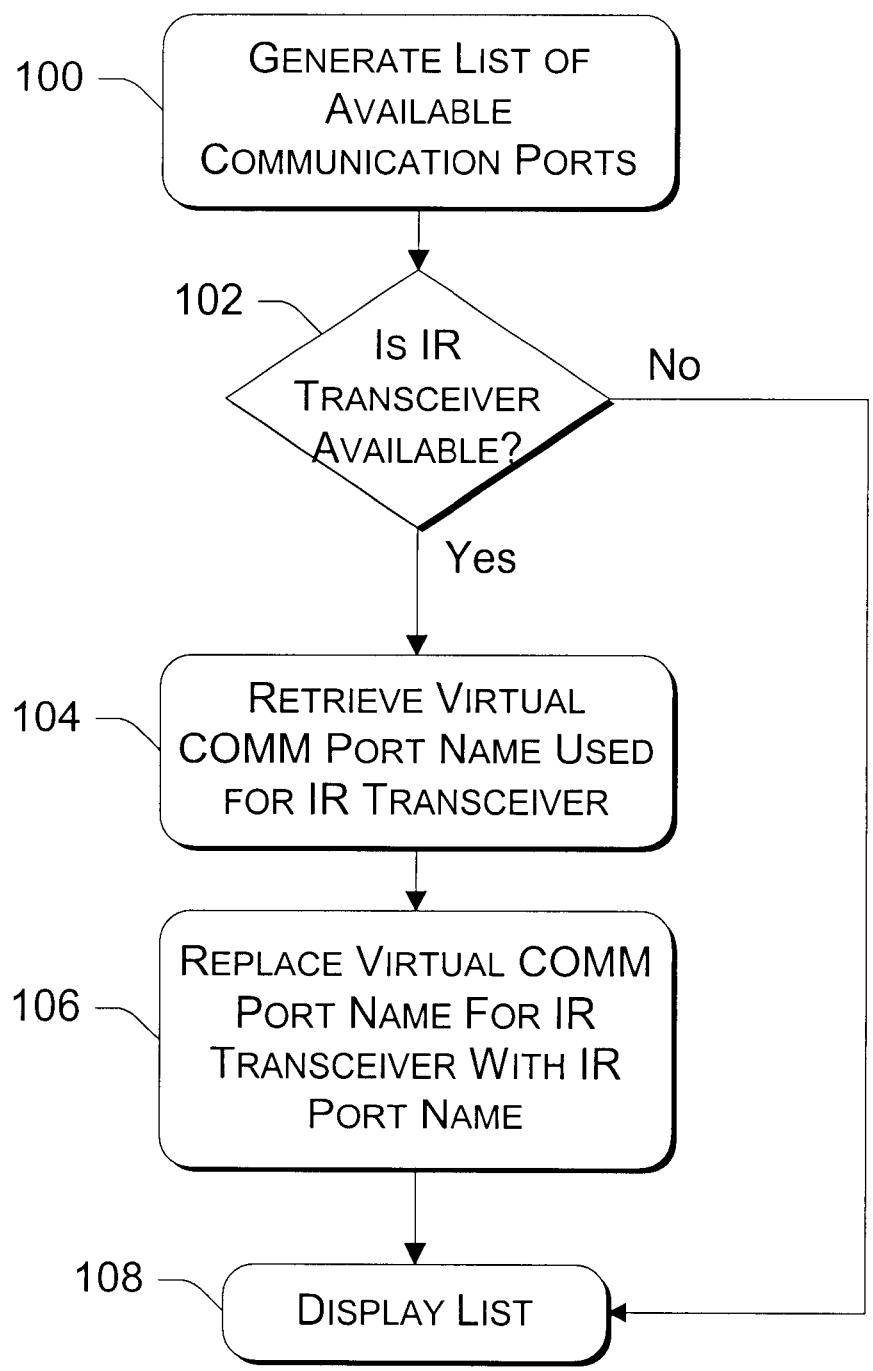
FIG. 2 is a flow diagram of a method for identifying a COMM port dedicated to an IR transceiver used to communicate with IR devices and renaming the COMM port with a user-friendlier, descriptive virtual port name.

FIG. 2 shows a method for identifying a COMM port dedicated to communicate with IR devices and renaming the COMM port with a user-friendlier, descriptive virtual port name. These steps are performed, for example, in software by the port detector 66 and the port renaming module 68. At step 100, the port detector 66 generates a list of available communication ports. One preferred technique for generating this list at step 100 is described below in more detail with respect to FIG. 3.

For purposes of discussion, suppose that the port detector 66 generates a list of seven available communication ports: COM0, COM1, COM3, COM4, COM6, COM7, and COM9. At this point, the list is kept hidden and is not presented to the user. Rather, the port renaming module 68 will first utilize the list to evaluate whether any of these COMM ports is dedicated to the IR transceiver 40.

At step 102, the port renaming module 68 determines whether the COMM port for communicating with an IR device is available. In one implementation, the port renaming module 68 checks the system registry 64 to determine whether an IR transceiver 40 has been configured for the computer system and which, if any, of the available COMM ports is associated with the IR transceiver 40. If no IR transceiver is listed in the registry 64 (i.e., the "no" branch from step 102), the computer displays the list of non-descriptive virtual port names for the available COMM ports (step 108). In this case, there is no need for renaming a port because there is no IR transceiver registered.

On the other hand, suppose that the port renaming module 68 learns from the registry 64 that IR transceiver 40 is registered and a communication port (e.g., "COM4") is associated with it. In this case (i.e., the "yes" branch from step 102), the port renaming module 68 retrieves the virtual port name "COM4" from the registry 64 (step 104). The port renaming module 68 then replaces the non-descriptive virtual port name "COM4" with a more descriptive and IR-related virtual port name, such as "Infrared Port" (step 106). After the renaming, the computer 22 displays the list of non-descriptive virtual port names for available COMM ports, along with a descriptive virtual port name for the IR-dedicated port (step 108). Table 1 summarizes this process.

TABLE 1

| Virtual Port Names of Available COMM ports (after Step 102; Not Displayed to User) | Renamed Virtual Port Names (after Step 106; Displayed to User) |
| --- | --- |
| COM0 | COM0 |
| COM1 | COM1 |
| COM3 | COM3 |
| COM4 | Infrared Port |

TABLE 1-continued

| Virtual Port Names of Available COMM ports (after Step 102; Not Displayed to User) | Renamed Virtual Port Names (after Step 106; Displayed to User) |
| --- | --- |
| COM6 | COM6 |
| COM7 | COM7 |
| COM9 | COM9 |

Figure 3:
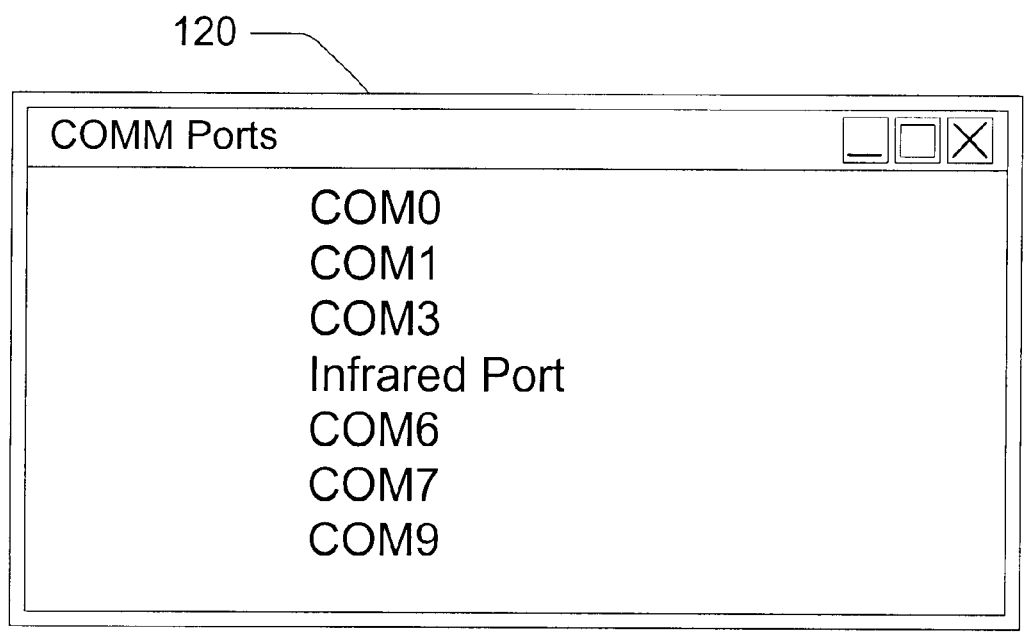
FIG. 3 is a diagrammatic illustration of a graphical user interface window embodied as a "COMM Port" dialog box.

FIG. 3 shows an exemplary dialog box 120 that lists the virtual port names for the user. Notice that the virtual port name "COM4" is renamed "Infrared Port" (or other suitable name). With this list, the use easily understands which COMM port is associated with the IR device, thereby improving the user experience during configuration.

Figure 4:
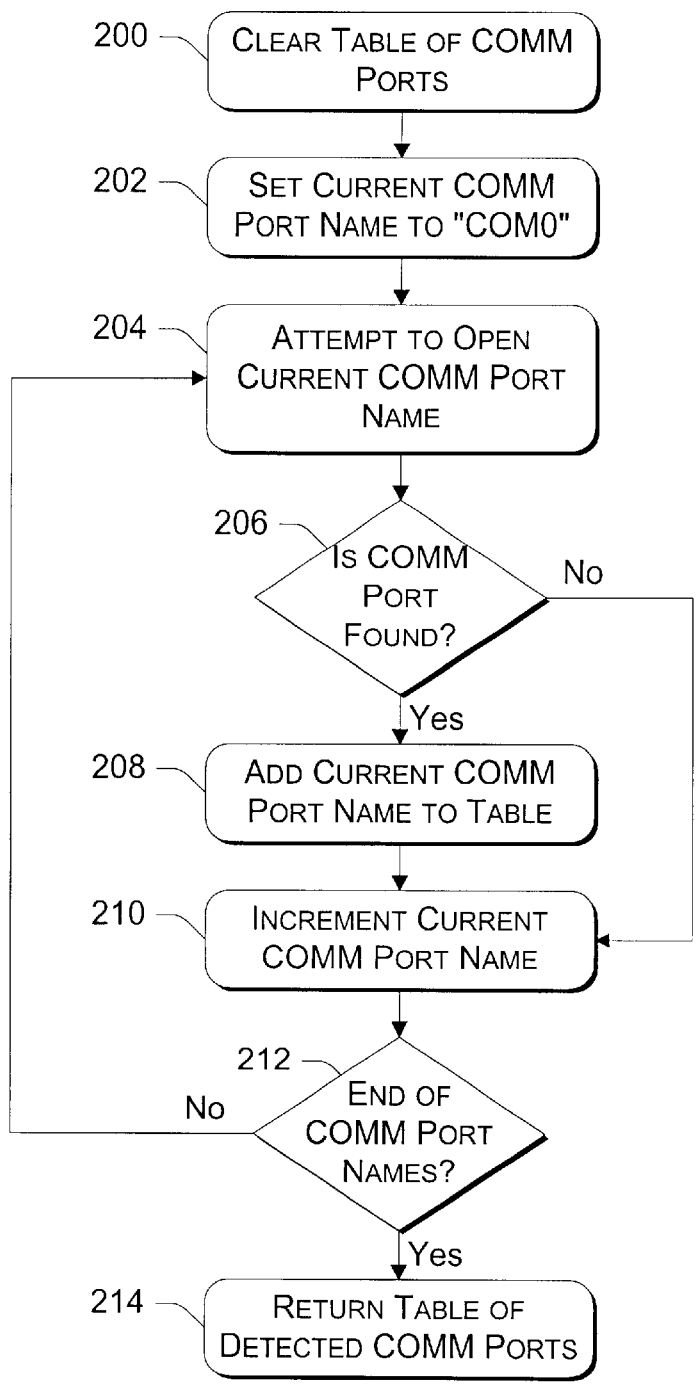
FIG. 4 is a flow diagram of a method for detecting the available COMM ports, which is used in the FIG. 2 method.

FIG. 4 shows one preferred method for detecting the available COMM ports at step 100 in FIG. 2. These steps are performed, for example, in software by port detector 66. At step 200, the port detector 66 clears a table of COMM ports. It then sets the current COMM port name to an initial virtual port name, such as "COM0" (step 202). At step 204, the port detector 66 attempts to open the current COMM port name. In the case of a Windows-brand operating system, the port detector 66 uses the CreateFile Win32 API (application program interface) to open each possible COMM port name. A Win32 result code of "NOERROR" or "ERROR_ACCESS_DENIED" indicates that the communication port is present. The "NOERROR" code implies that the port is present and unused. The "ERROR_ACCESS_DENIED" code implies that the port is present, but presently busy.

If the COMM port is found (i.e., the "yes" branch from step 206), the port detector 66 adds the current virtual COMM port name (e.g., "COM0") to the table (step 208) and increments the current COMM port name to the next value, such as "COM1" (step 210). If, on the other hand, the COMM port is not found (i.e., the "no" branch from step 206), the port detector 66 does not add the current COMM port name to the table and increments to the next COMM port name (e.g., "COM1").

The port detector 66 repeats this process until it has cycled through all of the port names, as indicated by decision step 212 and loop back to step 204. Once the port detector has attempted to open all of the COMM ports, it returns the table containing the detected COMM ports (step 214).

Figure 5:
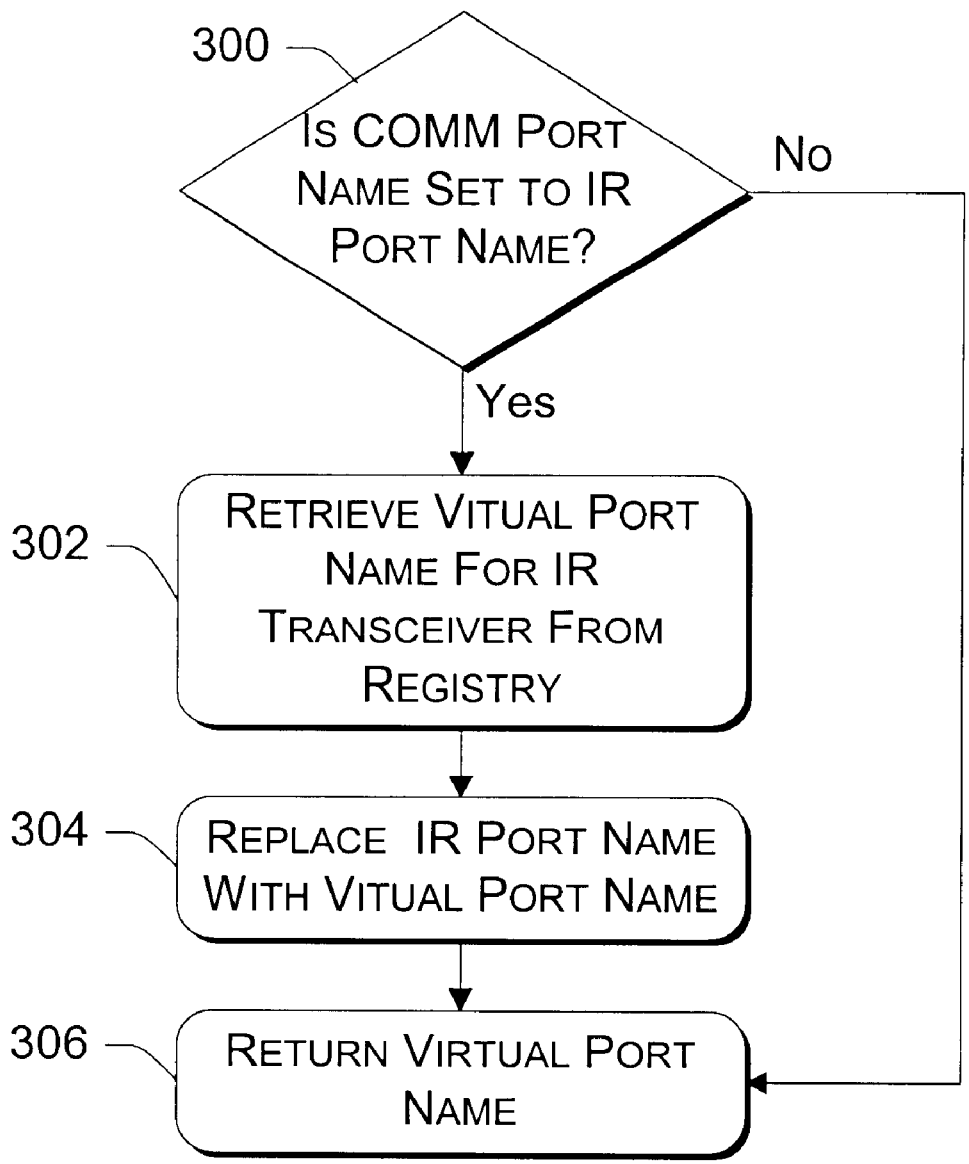
FIG. 5 is a flow diagram of a method for converting the descriptive virtual port name back to the original virtual port name.

FIG. 5 shows a method for converting the descriptive virtual port name (e.g., "Infrared Port") back to the original virtual port name (e.g., "COM4"). This process is useful, for example, in the case where the user enters a friendly and descriptive name, such as "Infrared Port", during configuration and the computer internally prefers handling its own non-descriptive virtual port name, such as "COM4". These steps are preformed in software by the port renaming module 68.

At step 300, the port renaming module 68 determines whether the COMM port name is currently set to a descriptive port name, such as "Infrared Port". If not (i.e., the "no" branch from step 300), it simply returns the present port name (step 306). On the other hand, if a descriptive port name exists (i.e., the "yes" branch from step 300), the port renaming module 68 retrieves the virtual port name "COM4" from the registry 64 (step 302). The port renaming module 68 then substitutes the non-descriptive virtual port name "COM4" for the descriptive virtual port name "Infrared Port" (step 304). After the renaming, the port renaming module 66 returns the virtual port name for internal use (step 306). Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer system comprising:
   an infrared (IR) transceiver;
   a port detector to detect which communication ports are available, the communication ports having corresponding virtual port names;
   a port renaming module to identify at least one of the communication ports as being associated with the IR transceiver and to rename the one communication port from its corresponding virtual port name to a different virtual port named;
   a system registry that contains configuration parameters of the computer system, wherein the port renaming module is configured to check the system registry to identify the one communication port associated with the IR transceiver.

2. A computer system of claim 1, wherein the different virtual port name is descriptive to inform a user that the corresponding communication port is associated with the IR transceiver.

3. A computer system of claim 1, wherein the port detector is configured to cycle through the communication ports and attempt to open the communication ports, the port detector using results from the attempts to determine whether the communication ports are available.

4. A computer system of claim 1, wherein the port renaming module is configured to rename the communication port associated with the IR transceiver from the different virtual port name back to the corresponding virtual port name.

5. A computer system of claim 1, further comprising a user interface to present a list of the virtual port names along with the different virtual port name.

6. An operating system, embodied on a computer-readable medium, comprising:
   computer-executable instructions to detect which communication ports of a computer are available, the communication ports having corresponding virtual port names;
   computer-executable instructions to identify at least one of the communication ports as being used for communicating with an infrared (IR) device, wherein the identifying comprises checking a system registry of the operating system to identify at least one of the communication ports as being used for communicating with the IR device; and
   computer-executable instructions to rename the one communication port from its corresponding virtual port name to a different virtual port name.

7. An operating system of claim 6, wherein the different virtual port name is descriptive to inform a user that the corresponding communication port is associated with the IR device.

8. An operating system of claim 6, further comprising computer-executable instructions to attempt to open each of the communication ports as a way to determine whether the communication ports are available.

9. An operating system of claim 6, further comprising computer-executable instructions to rename the communication port associated with the IR device from the different virtual port name back to the corresponding virtual port name.

10. An operating system of claim 6, further comprising computer-executable instructions to present a list of virtual port names along with the different virtual port name.

11. A computer comprising:
    a processor; and
    the operating system of claim 7, embodied on the computer-readable medium, and executed on the processor.

12. A computer program module, embodied on a computer-readable medium, comprising;
    computer-executable instructions to identify a communication port for use in communicating with an infrared (IR) device, wherein the identifying comprises checking a computer system registry to identify the communication port for use in communicating with the IR device; and
    computer-executable instructions to rename the communication port to a descriptive virtual port name.

13. A computer program module of claim 12, further comprising computer-executable instructions to present the descriptive virtual port name in a user interface.

14. A computer program module of claim 12, further comprising computer-executable instructions to rename the communication port associated with the IR device from the descriptive virtual port name to another virtual port name.

15. An operating system incorporating the computer program module of claim 12.

16. A computer program module, embodied on a computer-readable medium, comprising:
    computer-executable instructions to check a computer system registry to identify a communication port for use in communicating with an infrared (IR) device;
    computer-executable instructions to rename is the communication port for use in communicating with an infrared (IR) device from a first virtual port name to a second virtual port name; and
    computer-executable instructions to present the second virtual port name in a user interface.

17. A computer program module of claim 16, further comprising computer-executable instructions to rename the communication port associated with the IR device from the second virtual port name back to the first virtual port name.

18. An operating system incorporating the computer program module of claim 16.

19. A computer-implemented method, comprising:
    detecting available communication ports, the communication ports having corresponding virtual port names;
    identifying at least one of the communication ports as being used in communication with an infrared (IR) device wherein the identifying comprises checking a system registry to identify the one communication port associated with the IR device; and
    renaming the one communication port from its corresponding virtual port name to a different virtual port name.

20. A computer-implemented method of claim 19, wherein the detecting comprises attempting to open the communication ports as a way to determine whether the communication ports are available.

21. A computer-implemented method of claim 19, further comprising presenting a list of the virtual port names along with the different virtual port name.

22. A computer-implemented method of claim 19, further comprising renaming the one communication port from the different virtual port name back to the corresponding virtual port name.

23. A computer-implemented method, comprising:

identifying a communication port that is used for communicating with an infrared (IR) device wherein the identifying comprises checking a system registry to identify the one communication port associated with the IR device; and renaming the communication port from a first virtual port name to a second virtual port name.

24. A computer-implemented method of claim 23, further comprising presenting the second virtual port name to a user.

25. A computer-implemented method of claim 23, further comprising renaming the communication port associated with the IR device from the second virtual port name back to the first virtual port name.

26. A computer-implemented method, comprising:

identify a computer system registry to a communication port associated with an infrared (IR) device;

renaming the communication port associated with an infrared (IR) device from a first virtual port name to a second virtual port name; and presenting the second virtual port name to a user.

27. A computer-implemented method of claim 26, further comprising renaming the communication port associated with the IR device from the second virtual port name back to the first virtual port name.

* * * * *

UNITED STATES PATENT AND TRADEMARK OFFICE
CERTIFICATE OF CORRECTION

PATENT NO.     : 6,625,669 B1
DATED          : September 23, 2003
INVENTOR(S)    : Cedola It is certified that error appears in the above-identified patent and that said Letters Patent is hereby corrected as shown below:

<u>Column 5,</u>
Line 16, replace "named" with -- name; and --.

<u>Column 8,</u>
Line 3, replace "identify" with -- identifying --.
Line 3, insert -- identify" -- between "to" and "a".

Signed and Sealed this

Seventeenth Day of February, 2004

JON W. DUDAS
*Acting Director of the United States Patent and Trademark Office*